United States Patent
Hori

(10) Patent No.: US 7,944,911 B2
(45) Date of Patent: May 17, 2011

(54) NETWORK DEVICE

(75) Inventor: Yasuhisa Hori, Kizugawa (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 491 days.

(21) Appl. No.: 12/088,706

(22) PCT Filed: Sep. 28, 2006

(86) PCT No.: PCT/JP2006/319257
§ 371 (c)(1),
(2), (4) Date: Mar. 31, 2008

(87) PCT Pub. No.: WO2007/040132
PCT Pub. Date: Apr. 12, 2007

(65) Prior Publication Data
US 2010/0157976 A1    Jun. 24, 2010

(30) Foreign Application Priority Data
Oct. 6, 2005    (JP) ................................. 2005-293888

(51) Int. Cl.
*H04L 12/66* (2006.01)
(52) U.S. Cl. ....................................... 370/352; 370/353
(58) Field of Classification Search .................. 370/352; 379/93.05
See application file for complete search history.

(56) References Cited

U.S. PATENT DOCUMENTS

| | | | |
|---|---|---|---|
| 5,179,586 A * | 1/1993 | Lee .............................. | 379/93.05 |
| 7,620,825 B2 * | 11/2009 | Camagna et al. ............. | 713/300 |
| 2003/0133437 A1 * | 7/2003 | Richarson et al. ............ | 370/352 |
| 2004/0218583 A1 * | 11/2004 | Adan et al. ..................... | 370/352 |
| 2006/0221938 A1 * | 10/2006 | Lin et al. ....................... | 370/352 |

FOREIGN PATENT DOCUMENTS

| | | |
|---|---|---|
| JP | 2003-348226 A | 12/2003 |
| JP | 2004-7314 A | 1/2004 |
| JP | 2004-80483 A | 3/2004 |
| JP | 2005-5875 A | 1/2005 |
| JP | 2005-26898 A | 1/2005 |
| JP | 2005-39470 A | 2/2005 |
| JP | 2005-86286 A | 3/2005 |
| JP | 2006-319699 A | 11/2006 |

* cited by examiner

*Primary Examiner* — William Trost, IV
*Assistant Examiner* — Emmanuel Maglo
(74) *Attorney, Agent, or Firm* — Birch, Stewart, Kolasch & Birch, LLP

(57) ABSTRACT

A first telephone, which is connected to a network device, can be prevented from becoming communicable with a second telephone, which is connected to the network device over a public network, when the second telephone and a third telephone, which is an Internet telephone, are communicable with each other and a device operating voltage for operating the network device is no longer supplied.

6 Claims, 8 Drawing Sheets

| NO. | INPUTS | | | | OUTPUT |
|---|---|---|---|---|---|
| | S# | R# | D | CLK | Q |
| 1 | L | H | X | X | H |
| 2 | H | L | X | X | L |
| 3 | L | L | X | X | H |
| 4 | H | H | L | L→H | L |
| 5 | H | H | H | L→H | H |
| 6 | H | H | X | H→L | NO CHANGE |
| 7 | H | H | X | H or L | NO CHANGE |

US 7,944,911 B2

NETWORK DEVICE

TECHNICAL FIELD

The present invention relates to network devices and particularly to network devices capable of switching a connection status of a telephone line.

BACKGROUND ART

Recently, Internet Protocol (IP) network call service utilizing an IP increasingly spreads. Accordingly a technique to switch where to connect a telephone selectively between an IP network and a public network is indispensable. (This technique will hereinafter also be referred to as "the switching technique".) A public network, as referred to herein, indicates public switched telephone networks (PSTN).

Such techniques are disclosed in Japanese Patent Laying-open Nos. 2004-007314 (Patent Document 1), 2005-005875 (Patent Document 2), and 2005-086286 (Patent Document 3).

Japanese Patent Laying-open No. 2004-007314 (Patent Document 1) discloses that a telephone rate table previously prepared as based on telephone numbers is used to switch where to connect a telephone selectively between an IP network and a public network.

Japanese Patent Laying-open No. 2005-005875 (Patent Document 2) discloses connecting a telephone, as switched in response to a calling signal of a telephone network or an IP network, and connecting the telephone to the telephone network when a power failure occurs.

Japanese Patent Laying-open No. 2005-086286 (Patent Document 3) discloses that when a power failure is detected, the power of a public network is used to dial from a telephone network to the person that had been calling before the power failure to resume the call.

Patent Document 1: Japanese Patent Laying-open No. 2004-007314
Patent Document 2: Japanese Patent Laying-open No. 2005-005875
Patent Document 3: Japanese Patent Laying-open No. 2005-086286

DISCLOSURE OF THE INVENTION

Problems to be Solved by the Invention

A public network in general allows a maximum of two calls with a single cable, while an IP network allows three or more calls with a single cable.

However, a call over the IP network requires power, and when a power failure occurs, the call over the IP network cannot be made. Accordingly, a conventional communication device that employs the EP network to make a call is adapted to switch where to connect to a public network at a power failure to allow the call to continue even at the power failure.

FIG. 8 is a block diagram showing an internal configuration of a conventional network device 10000 capable of switching a communication line. With reference to FIG. 8, network device 10000 includes communication units 210A, 210C, and communication units 210B, 210D. Communication units 210A, 210C have a function of an interface capable of connecting an analog telephone line. Communication unit 210A is connected by the analog telephone line to an analog telephone 100A. Communication unit 210A has a function determining whether analog telephone 100A is on the hook or off the hook. Communication unit 210C is connected over a public network 70C to an analog telephone 100C.

Communication units 210B, 210D have a function of an interface for communication that utilizes Ethernet®. Communication unit 210B is connected over an IP network 70E to a Voice over Internet Protocol (VoIP) telephone 100B. Note that communication unit 210B may be connected through a LAN cable directly to VoIP telephone 100B. Communication unit 210D is connected over an IP network 70D to a VoIP telephone 100D. Note that communication unit 210D may be connected through a LAN cable directly to VoIP telephone 100D.

Network device 10000 further includes a control unit 230, a line interface unit (LIU) 222, a subscriber line interface circuit (SLIC) 224, and a switch unit 240.

Control unit 230 has a function controlling each component in network device 10000. Furthermore, control unit 230 has a function communicating data with each component in network device 10000.

LIU 222 is a circuit having a function for connecting to public network 70C in response to an instruction issued from control unit 230. Furthermore, LIU 222 has a function performing a process for receiving a calling signal from public network 70C, a process for receiving a telephone number of an originator over public network 70C, a process for generating a dial number, an audio process, and the like.

SLIC 224 has a function generating a pseudo public network. This allows a calling signal to be transmitted to analog telephone 100A connected to communication unit 210A. Furthermore, SLIC 224 has a function performing a process for generating a telephone number of an originator, a process for receiving a dial signal from a telephone, an audio process, and the like.

In the following description, a signal and a signal line have binary, high voltage (i.e., voltage Vcc) and low voltage statuses also referred to as an "H level" and an "L level", respectively.

Switch unit 240 has a function switching, in response to a switch control signal transmitted from control unit 230, where to connect analog telephone 100A connected to communication unit 210A between public network 70C and IP network 70D. More specifically, switch unit 240 has a function electrically connecting communication units 210A and 210C together when the switch control signal has the L level. Furthermore, switch unit 240 has a function electrically connecting communication unit 210A and SLIC 224 together when the switch control signal has the H level.

Furthermore, switch unit 240 electrically connects communication units 210A and 210C together when a power supply unit 320 for a system, which will be described later, does not supply an operating voltage (Vcc). Furthermore, switch unit 240 has a function such that when the operating voltage supplied from power supply unit 320 for the system described later decreases, switch unit 240 electrically connects communication units 210A and 210C together before the operating voltage is no longer supplied.

Network device 10000 further includes a power supply unit 300. Power supply unit 300 includes an AC adapter 310, and power supply unit 320 for the system. AC adapter 310 receives an alternate current voltage supplied from an AC power supply, converts the received alternate current voltage to a direct current voltage of a predetermined level (for example of 5V), and supplies the direct current voltage to power supply unit 320 for the system.

Power supply unit 320 for the system receives the direct current voltage from AC adapter 310. Power supply unit 320 for the system supplies each component (e.g., switch unit 240) internal to network device 10000 with operating voltage Vcc. In other words, each component in network device 10000 operates on operating voltage Vcc.

Network device 10000 can concurrently perform a process for a call between analog telephone 100A and VoIP telephone 100D and that for a call between analog telephone 100C and VoIP telephone 10013. In other words, network device 10000 allows a plurality of processes for calls, respectively, to be concurrently performed. In this case, analog telephone 100A can have a call with VoIP telephone 100D via a first call path defined by communication unit 210A, switch unit 240, SLIC 224, control unit 230, communication unit 210D and IP network 70D. Furthermore, analog telephone 100C can have a call with VoIP telephone 100B via a second call path defined by public network 70C, communication unit 210C, LIU 222, control unit 230, communication unit 210B and IP network 70E. When the first and second call paths are concurrently used and if in that condition a power failure occurs (i.e. the power to power supply unit 300 decreases), network device 10000 performs a process to switch where to connect analog telephone 100A from IP network 70D to public network 70C. More specifically, when the operating voltage supplied from power supply unit 320 for the system decreases, switch unit 240 electrically connects communication units 210A and 210C together before the operating voltage is no longer supplied.

Thus a process will be performed such that analog telephone 100A uses the power of public network 70C to have a call with analog telephone 100C via a third call path defined by communication unit 210A, switch unit 240, communication unit 210C and public network 70C. More specifically, when the first and second call paths are concurrently used and if in that condition a power failure occurs, conventional network device 10000 disadvantageously causes analog telephone 100A having a call with VoIP telephone 100D to unintentionally become communicable with analog telephone 100C.

This is attributed to a property of a line of a public network. To disallow a signal to be communicated between public network 70C and analog telephone 100C connected to public network 70C, it is necessary that a line serving as a path extending between analog telephone 100C and VoIP telephone 100B have an on-hook status detected for at least one second. In the following, a period of time required to disallow a signal to be communicated between a public network and an analog telephone connected to the public network will also be referred to as a "period of time required to disable public network communication".

Thus for example if a power failure or the like occurs, and LIU 222 no longer operates and a line serving as a path connecting analog telephone 100C and VoIP telephone 100B together is disconnected, switch unit 240 operates as described above to connect communication units 210A and 210C together. As such, if analog telephone 100A and analog telephone 100C are off the hook, analog telephone 100A is disadvantageously, unintentionally connected to analog telephone 100C.

The present invention has been made to overcome the above described disadvantage, and it contemplates a network device capable of preventing unintentional line connection between a plurality of telephones.

Means for Solving the Problems

To resolve the above disadvantage, the present invention in one aspect provides a network device having a plurality of telephones each connected thereto over a public network or an Internet network or directly, including: a switch unit for switching where to connect a first telephone of the plurality of telephones between the public network and the Internet network, the first telephone being connected directly to the network device; and a power supply unit for supplying the switch unit with an operating voltage for operating the switch unit, wherein: the power supply unit is capable of supplying the operating voltage for a predetermined period of time as counted from when a device operating voltage supplied to operate the network device is no longer supplied; of the plurality of telephones, a second telephone is connected over the public network to the network device; of the plurality of telephones, a third telephone is an Internet telephone; and the switch unit includes an erroneous connection prevention unit preventing the first and second telephones from becoming communicable with each other when the second and third telephones are communicable with each other and if in that condition the network device is no longer supplied with the device operating voltage.

Preferably, the third telephone is connected over the Internet network to the network device, and after supplying the network device with the device operating voltage starts, the erroneous connection prevention unit connects the first telephone to the Internet network if the first telephone is disconnected from the public network.

Preferably, the public network disallows a signal to be communicated between the public network and the second telephone when a path connecting the second and third telephones together is on the hook for a specified period of time shorter than the predetermined period of time, and when the second and third telephones are communicable with each other, and the network device is no longer supplied with the device operating voltage, then after the network device is no longer supplied with the device operating voltage when the predetermined period of time elapses the erroneous connection prevention unit connects the first telephone to the public network.

Preferably, the third telephone is connected over the Internet network to the network device, and after supplying the network device with the device operating voltage starts, the erroneous connection prevention unit connects the first telephone to the Internet network if the first telephone is disconnected from the public network.

Preferably, the public network disallows a signal to be communicated between the public network and the second telephone when a path connecting the second and third telephones together is on the hook for a specified period of time shorter than the predetermined period of time, and when the public network and the second telephone cannot communicate a signal therebetween and if the network device is no longer supplied with the device operating voltage, then after the network device is no longer supplied with the device operating voltage the erroneous connection prevention unit connects the first telephone to the public network.

Preferably, the third telephone is connected over the Internet network to the network device, and after supplying the network device with the device operating voltage starts, the erroneous connection prevention unit connects the first telephone to the Internet network if the first telephone is disconnected from the public network.

Effects of the Invention

The present network device can prevent a first telephone connected to the network device and a second telephone connected to the network device over a public network from becoming communicable with each other when the second telephone and a third telephone which is an Internet telephone are communicable with each other and a device operating voltage for operating the network device is no longer supplied.

The present network device can thus effectively prevent unintentional line connection between a plurality of telephones.

BRIEF DESCRIPTION OF THE DRAWINGS

FIG. 3 shows an operation table.

DESCRIPTION OF THE REFERENCE SIGNS

70C: public network, 70D, 70E: IP network, 230: control unit, 240: switch unit, 322A: power supply unit for switching, 320A: power supply unit for system, 400: status holding unit, 1000: network device

BEST MODES FOR CARRYING OUT THE INVENTION

Hereinafter reference will be made to the drawings to describe an embodiment of the present invention. In the following description, identical components are identically denoted. Their names and functions are also identical. Accordingly, they will not be described repeatedly in detail.

Figure 1:
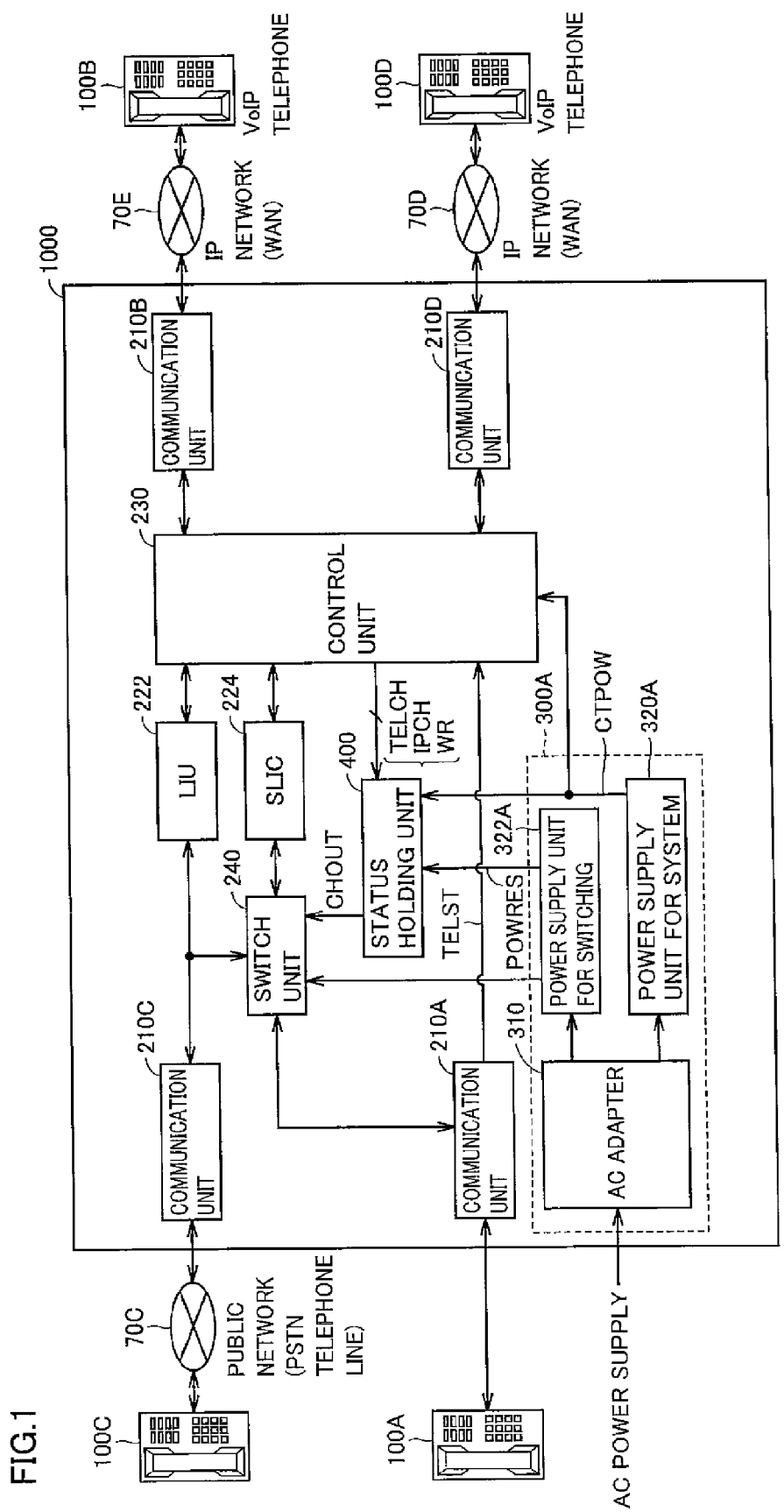
FIG. 1 is a block diagram showing an internal configuration of a network device in an embodiment.

FIG. 1 is a block diagram showing an internal configuration of a network device 1000 in the present embodiment. With reference to FIG. 1, network device 1000 differs from the FIG. 8 network device 10000 in that the former further includes a status holding unit 400, and a power supply unit 300A rather than power supply unit 300, and that communication unit 210A communicates data with control unit 230. The remainder is similar to that of network device 10000, and will not be described repeatedly in detail.

Figure 8:
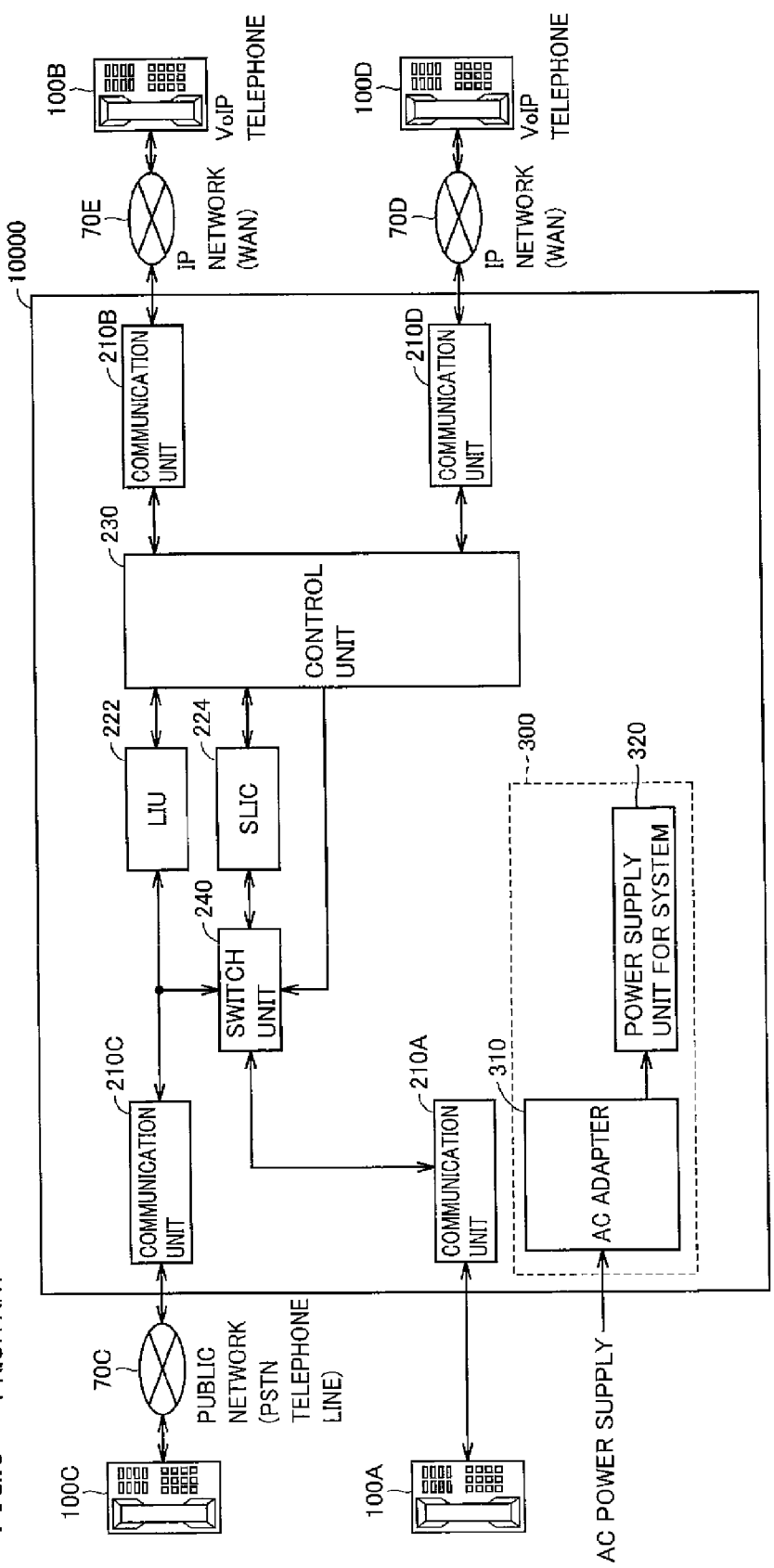
FIG. 8 is a block diagram showing an internal configuration of a conventional network device capable of switching a communication line.

Power supply unit 300A differs from the FIG. 8 power supply unit 300 in that the former includes a power supply system 320A for a system, rather than power supply unit 320 for a system, and further includes a power supply unit 322A for switching. The remainder is similar to that of power supply unit 300, and will not be described repeatedly in detail.

Power supply unit 320A for the system receives direct current voltage from AC adapter 310. Power supply unit 320A for the system supplies each component internal to network device 1000 excluding switch unit 240 and status holding unit 400 with operating voltage Vcc. Note that power supply unit 320A for the system supplies a voltage supply signal CTPOW corresponding to the operating voltage for control unit 230 to control unit 230 and to status holding unit 400 as well. Note that status holding unit 400 does not use voltage supply signal CTPOW as an operating voltage. Rather, status holding unit 400 monitors the level in voltage of voltage supply signal CTPOW.

Power supply unit 322A for switching supplies switch unit 240 and status holding unit 400 with operating voltage Vcc. In other words, the present embodiment provides power supply unit 300A, in comparison with power supply unit 300, including power supply unit 322A for switching to serve as a power supply unit dedicated to switch unit 240 and status holding unit 400.

Power supply unit 322A for switching has a function utilizing a direct current voltage supplied from AC adapter 310 to store a predetermined amount of power. More specifically, power supply unit 322A for switching includes a capacitor of a large capacity storing a predetermined amount of power. As such, if a power failure or the like occurs and accordingly AC adapter 310 does not supply voltage, power supply unit 322A for switching can supply switch unit 240 and status holding unit 400 with a predetermined level of voltage (or voltage Vcc) for a predetermined period of time T1 (for example of two seconds). Herein, the predetermined period of time T1 is a period of time longer than a period of time required to disable public network communication that is required to disconnect a line of public network 70C (e.g., one second).

After AC adapter 310 starts to supply power supply unit 322A for switching and power supply unit 320A for the system with direct current voltage, power supply unit 322A for switching transmits a power supply reset signal POWRES to status holding unit 400. Power supply reset signal POWRES is a signal holding the L level for a predetermined period of time (for example of one second) to initialize status holding unit 400, and thereafter attaining the H level. Furthermore, power supply reset signal POWRES holds the H level until AC adapter 310 ceases to supply power supply unit 322A for switching and power supply unit 320A for the system with the direct current voltage.

Note that the period of time after AC adapter 310 starts to supply power supply unit 322A for switching and power supply unit 320A for the system with the direct current voltage before an operating voltage that power supply unit 322A for switching supplies to each component, as aforementioned, attains a level of Vcc (or the H level) is shorter by a predetermined period of time (for example of two seconds) than the period of time after AC adapter 310 starts to supply power supply unit 322A for switching and power supply unit 320A for the system with the direct current voltage before an operating voltage that power supply unit 320A for the system supplies to each component, as aforementioned, attains the level of Vcc (or the H level).

As aforementioned, communication unit 210A determines whether analog telephone 100A is on the hook or off the hook, and communication unit 210A sets at the H level or the L level a telephone status signal TELST transmitted to control unit 230. Telephone status signal TELST of the L level is a signal indicating that analog telephone 100A is on the hook. Telephone status signal TELST of the H level is a signal indicating that analog telephone 100A is off the hook.

Control unit 230 transmits a line switching signal TELCH, a line switching signal IPCH and a write signal WR to status holding unit 400 in response to a status of each component internal to network device 1000. Line switching signals TELCH and IPCH and write signal WR are signals for controlling status holding unit 400.

Status holding unit 400 operates in response to the plurality of signals transmitted from control unit 230 and voltage supply signal CTPOW to transmit a switch control signal CHOUT to switch unit 240 for switching a connection status of a line of switch unit 240.

Figure 2:
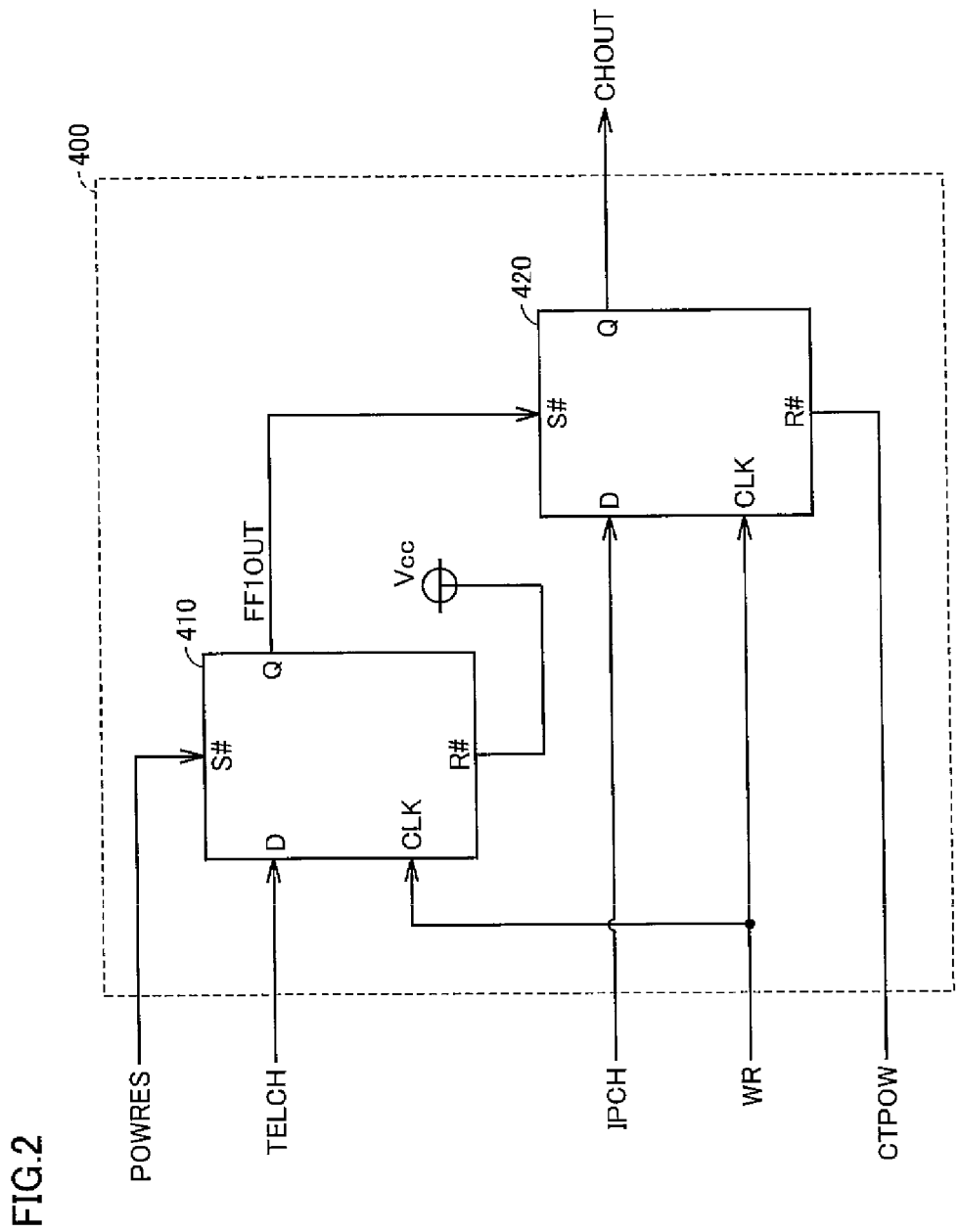
FIG. 2 is a block diagram showing an internal configuration of a status holding unit.

FIG. 2 is a block diagram showing an internal configuration of status holding unit 400. With reference to FIG. 2, status holding unit 400 includes flip flop circuits 410, 420. Flip flop circuit 410 includes input terminals S#, D, CLK, R#, and an output terminal Q. Input terminals S#, D, CLK of flip flop circuit 410 receive power supply reset signal POWRES, line switching signal TELCH and write signal WR, respectively.

Input terminal R# of flip flop circuit 410 receives operating voltage Vcc from power supply unit 322A for switching. More specifically, input terminal R# of flip flop circuit 410 receives a signal of the H level as long as power supply unit 322A for switching receives a predetermined level of direct current voltage from AC adapter 310. Output terminal Q of flip flop circuit 410 outputs an output signal FF1OUT.

Flip flop circuit 420, as well as flip flop circuit 410, includes input terminals S#, D, CLK, R# and output terminal Q. Input terminals S#, D, CLK, R# of flip flop circuit 420 receive output signal FF1OUT, line switching signal IPCH, write signal WR and voltage supply signal CTPOW, respectively. Output terminal Q of flip flop circuit 420 outputs switch control signal CHOUT. Flip flop circuit 420 operates in accordance with the same operation table (i.e. an operation table T100 as will be described hereinafter) as flip flop circuit 410.

Note that status holding unit 400 is not limited to the above described circuit configuration. It may have a different circuit configuration as long as it is a circuit configuration capable of performing a process described later.

FIG. 3 shows operation table T100. With reference to FIG. 3, operation table T100 indicates "NO.", which indicates a row number. Operation table T100 indicates "INPUTS", which indicates each input terminal of flip flop circuits 410, 420. Operation table T100 indicates "OUTPUT", which indicates the output terminals of flip flop circuits 410, 420.

Operation table T100 indicates "H", which indicates that an input terminal of a corresponding column receives a signal of the H level and an output terminal of a corresponding column outputs a signal of the H level. Operation table T100 indicates "L", which indicates that an input terminal of a corresponding column receives a signal of the L level and an output terminal of a corresponding column outputs a signal of the L level.

Operation table T100 indicates "L→H", which indicates that an input terminal of a corresponding column receives a signal having transitioned from the L level to the H level. Operation table T100 indicates "H→>L", which indicates that an input terminal of a corresponding column receives a signal having transitioned from the H level to the L level. Operation table T100 indicates "H or L", which indicates that whichever one of the H level and the L level a signal input to an input terminal of a corresponding column may have, an output signal of a corresponding row is not affected in level thereby.

Operation table T100 indicates "X", which indicates that whatever level a signal input to an input terminal of a corresponding column may have, an output signal of a corresponding row is determined in level.

For example, in operation table T100, for the input terminals S#, R#, D, CLK corresponding to a row number "1", L, H, X, X, correspond, respectively.

Operation table T100 indicates "NO CHANGE", which indicates that while the input terminals of a corresponding row each receive a signal having a status as indicated in operation table T100, an output terminal of a corresponding column outputs a signal unchanged in level.

For example, if output terminal Q outputs a signal of the H level, and input terminals S#, R# each receive a signal of the H level and input terminal CLK receives a signal having transitioned from the H level to the L level, output terminal Q outputs a signal holding the H level.

Hereinafter, how network device 1000 operates will be described. Note that even if network device 1000 is not supplied with operating voltage, analog telephone 100A can use the power of public network 70C to have a telephone call with analog telephone 100C. In that case, switch unit 240 electrically connects communication units 210A and 210C together. In the following, a voltage applied to operate network device 1000 will also be referred to as a device operating voltage.

When network device 1000 is supplied with a sufficient device operating voltage, network device 1000 initially sets analog telephone 100A ready for having a telephone call with VoIP telephone 100B or 100D.

Figure 4:
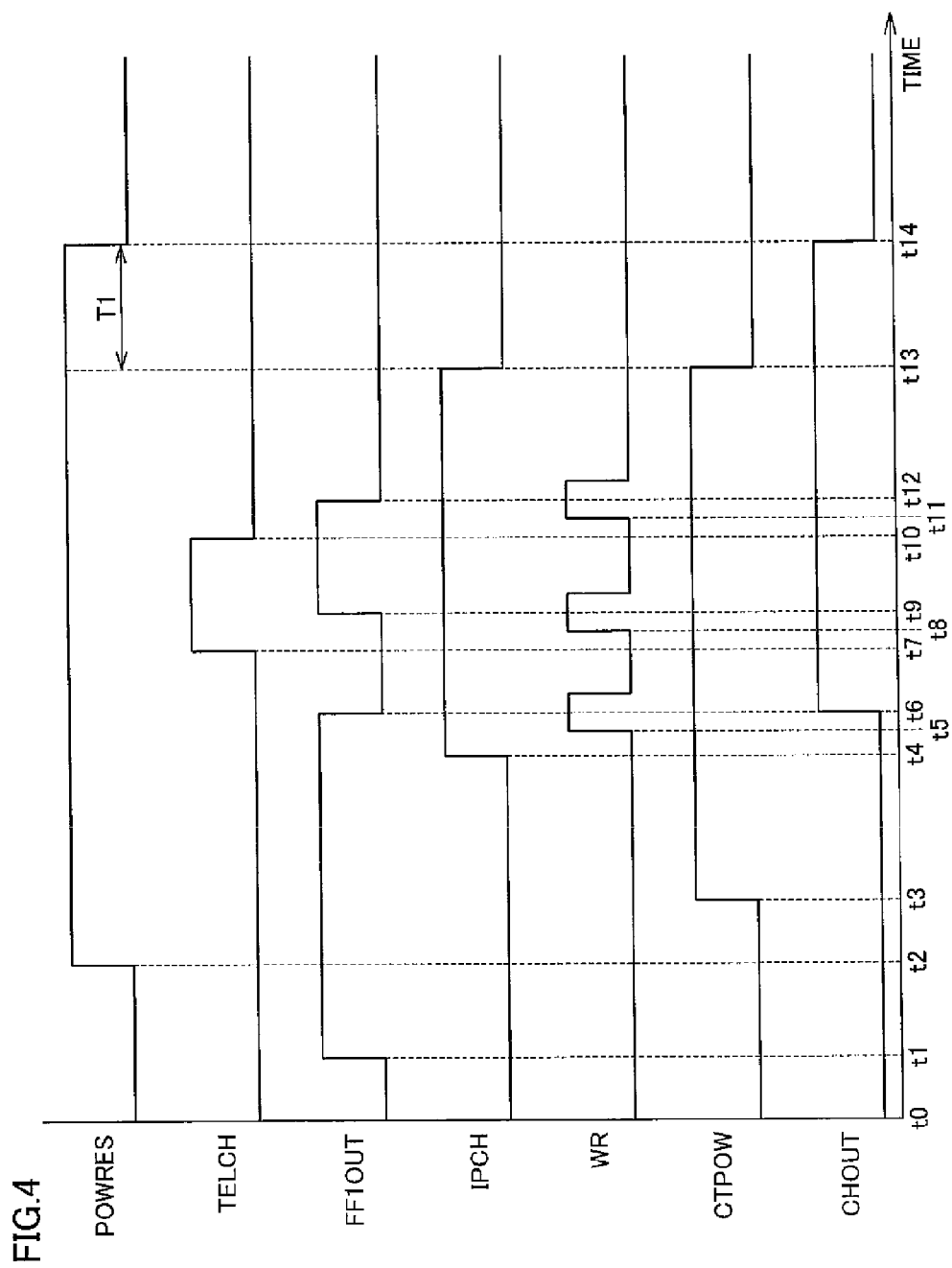
FIG. 4 is an operation waveform diagram, by way of example, for illustrating how the network device operates.

FIG. 4 is an operation waveform diagram, by way of example, for illustrating how network device 1000 operates. With reference to FIG. 4, prior to time t0, AC adapter 310 is not supplied from the AC power supply with alternate current voltage. More specifically, network device 1000 is not supplied with the device operating voltage and is thus powered off. When network device 1000 is powered on, then at time t0, supplying the alternate current voltage from the AC power supply to AC adapter 310 starts.

Subsequently at time t1 an operating voltage that power supply unit 322A for switching supplies to switch unit 240 and status holding unit 400 attains the H level (or Vcc). Thus at time t1 switch unit 240 and flip flop circuits 410, 420 internal to status holding unit 400 normally operate.

Furthermore, at time t1, power supply unit 322A for switching transmits power supply reset signal POWRES to status holding unit 400. As has been described previously, power supply reset signal POWRES is a signal holding the L level for a predetermined period of time (for example of one second) and thereafter attaining the H level. Note that at time t1 the operating voltage for control unit 230, i.e., voltage supply signal CTPOW has the L level in voltage. Accordingly at time t1 control unit 230 cannot operate, and line switching signals TELCH and IPCH and write signal WR have the L level in voltage.

Thus, input terminals S#, D, CLK of flip flop circuit 410 receive power supply reset signal POWRES of the L level, line switching signal TELCH of the L level, and write signal WR of the L level, respectively. Furthermore, input terminal R# of flip flop circuit 410 receives a signal of the H level.

Thus at time t1 flip flop circuit 410 outputs signal FF1OUT having the H level in accordance with each data of row number "1" of operation table T100.

Subsequently at time t2 power supply reset signal POWRES attains the H level. Subsequently at time t3 the operating voltage for control unit 230, i.e., voltage supply signal CTPOW, attains the H level in voltage. Thus at time t3 control unit 230 becomes normally operable. Furthermore at time t3 each component internal to network device 1000 becomes normally operable.

Communication unit 210A determines that analog telephone 100A is on the hook, and communication unit 210A sets telephone status signal TELST at the L level.

In response to telephone status signal TELST having the L level, i.e., when analog telephone 100A is on the hook, then at time t4 control unit 230 sets line switching signal IPCH at the H level. If analog telephone 100A is not on the hook, then, after analog telephone 100A is put on the hook, control unit 230 sets line switching signal IPCH at the H level.

Subsequently at time t5 control unit 230 sets write signal WR from the L level to the H level. Subsequently control unit 230 sets write signal WR at the L level.

The process performed at time t5, as described above, causes flip flop circuit 410 to output signal FF1OUT pulled to the L level at time t6 in accordance with each data of a row number "4" of operation table T100. Subsequently, write signal WR is set from the H level to the L level, whereas flip flop circuit 410 outputs signal FF1OUT holding the L level in accordance with each data of a row number "6" of operation table T100.

Furthermore the process performed at time t5 causes flip flop circuit 420 to output switch control signal CHOUT attaining the H level at time t6 in accordance with each data of a row number "5" of operation table T100. Subsequently, write signal WR is set from the H level to the L level, whereas flip flop circuit 420 outputs switch control signal CHOUT holding the H level in accordance with each data of row number "1" of operation table T100.

Switch unit 240 thus electrically connects communication unit 210A and SLIC 224 together.

Analog telephone 100A is thus set ready for having telephone call with VoIP telephone 100B or 100D. More specifically, after network device 1000 is powered on when analog telephone 100A is on the hook control unit 230 sets analog telephone 100A ready for having a telephone call with VoIP telephone 100B or 100D.

The reason therefore will be described hereinafter. For example when analog telephone 100A is having a call with analog telephone 100C, analog telephone 100A is off the hook. When analog telephone 100A is off the hook, performing the above described process interrupts the call between analog telephones 100A and 100C. Preventing this interruption of the call is the reason why when analog telephone 100A is on the hook control unit 230 sets analog telephone 100A ready for having a call with VoIP telephone 100B or 100D.

Note that if at a time between time t6 and time t7 analog telephone 100A is put off the hook and a process in which analog telephone 100A makes a call to VoIP telephone 100D is performed, control unit 230 receives via communication unit 210A, switch unit 240 and SLIC 224 a dial signal A output from analog telephone 100A. In that case, dial signal A includes dial information such as a telephone number of VoIP telephone 100D.

In accordance with dial signal A received, control unit 230 performs a calling process via communication unit 210D for IP network 70D by the telephone number based on dial signal A. VoIP telephone 100D is thus called, Then when the user puts VoIP telephone 100D off the hook, analog telephone 100A and VoIP telephone 100D become communicable with each other. Analog telephone 100A and VoIP telephone 100D thus become communicable with each other. When analog telephone 100A and VoIP telephone 100D are communicable with each other, analog telephone 100A is off the hook.

Communication unit 210A thus determines that analog telephone 100A is off the hook, and communication unit 210A sets telephone status signal TELST at the H level.

In response to telephone status signal TELST of the H level, i.e. when analog telephone 100A is off the hook, then at time t7 control unit 230 sets line switching signal TELCH at the H level. Subsequently at time t8 control unit 230 sets write signal WR from the L level to the H level. Subsequently control unit 230 sets write signal WR to the L level.

The process performed at time t8 causes flip flop circuit 410 to output signal FF1OUT attaining the H level at time t9 in accordance with each data of row number "5" of operation table T100. Subsequently, write signal WR is set from the H level to the L level, whereas flip flop circuit 410 outputs signal FF1OUT holding the H level in accordance with each data of row number "6" of operation table T100.

Furthermore the process performed at time t8 causes flip flop circuit 420 to output switch control signal CHOUT holding the H level at time t9 in accordance with each data of row number "1" of operation table T100. Subsequently, write signal WR is set from the H level to the L level, whereas flip flop circuit 420 outputs switch control signal CHOUT holding the H level in accordance with each data of row number "6" of operation table T100.

Herein if at a time between time t7 and time t10 a process in which VoIP telephone 100B makes a call to analog telephone 100C is performed, control unit 230 receives via IP network 70E and communication unit 210B a dial signal B output from VoIP telephone 100B. In that case, dial signal B includes dial information such as a telephone number of analog telephone 100C.

Control unit 230 in response to dial signal B received transmits to LIU 222 a control instruction for performing a calling process for public network 70C, and dial signal B. LIU 222 in response to the received control instruction performs the calling process for public network 70C via communication unit 210C by the telephone number based on dial signal B. Analog telephone 100C is thus called, and when a user takes analog telephone 100C off the hook, analog telephone 100C and VoIP telephone 100B become communicable with each other.

Thus analog telephone 100A and VoIP telephone 100D become communicable with each other and analog telephone 100C and VoIP telephone 100B become communicable with each other. Note that that analog telephone 100C and VoIP telephone 100B are communicable each other means that control unit 230 is communicable with public network 70C and that analog telephone 100C and VoIP telephone 100D are communicable each other also means that control unit 230 is communicable with public network 70C.

Once control unit 230 has become communicable with public network 70C, then at time t10 control unit 230 sets line switching signal TELCH at the L level. Subsequently at time t11 control unit 230 sets write signal WR from the L level to the H level. Subsequently control unit 230 sets write signal WR at the L level.

The process performed at time t11 causes flip flop circuit 410 to output signal FF1OUT pulled to the L level at time t12 in accordance with each data of row number "4" of operation table T100. Subsequently, write signal WR is set from the H level to the L level, whereas flip flop circuit 410 outputs signal FF1OUT holding the L level in accordance with each data of row number "6" of operation table T100.

Furthermore the process performed at time t11 causes flip flop circuit 420 to output switch control signal CHOUT holding the H level in accordance with each data of row number "5" of operation table T100. Subsequently, write signal WR is set from the H level to the L level, whereas flip flop circuit 420 outputs switch control signal CHOUT holding the H level in accordance with each data of row number "6" of operation table T100.

Subsequently if at time t13 a power failure occurs, then the operating voltage supplied by power supply 320A for the system to each component falls to L level. Accordingly, the operating voltage for control unit 230, i.e., voltage supply signal CTPOW, is also pulled to the L level. Accordingly, control unit 230 outputs line switching signal IPCH having the L level. LIU 222 and SLIC 224 also cease to operate. This puts the line between analog telephone 100C and VoIP telephone 100B on the hook. After LIU 222 has ceased to operate, once the time required to disable public network communication has elapsed, analog telephone 100C connected to public network 70C and public network 70 can no longer communicate a signal therebetween.

Even if a power failure occurs and AC adapter 310 no longer supplies voltage, power supply unit 322A for switching can supply switch unit 240 and status holding unit 400 with a predetermined level of operating voltage (i.e., voltage Vcc) for the predetermined period of time T1 (for example of two seconds) longer than the time required to disable public network communication. Thus switch unit 240 and status holding unit 400 are also normally operable at time t13.

At time t13 flip flop circuit 410 outputs signal FF1OUT holding the L level in accordance with each data of a row number "7" of operation table T100.

Furthermore at time t13 flip flop circuit 420 outputs switch control signal CHOUT holding the H level in accordance with each data of a row number "3" of operation table T100. Thus switch circuit 240 does not operate to electrically connect communication units 210A and 210C together when a power failure occurs or at time t13.

As has been described above, power supply unit 322A for switching can supply switch unit 240 and status holding unit 400 with the predetermined level of operating voltage (i.e., voltage Vcc) for the predetermined period of time T1 that is longer than the period of time required to disable public network communication, as counted from when AC adapter 310 no longer supplies voltage.

Accordingly, when the predetermined period of time T1 elapses from time t13, i.e., when time t14 arrives, the operating voltage supplied by power supply unit 322A for switching is pulled to the L level. Accordingly, the operating voltage supplied to status holding unit 400 is pulled to the L level and status holding unit 400 outputs switch control signal CHOUT having the L level.

Furthermore, when power supply unit 320 for the system supplies a decreasing operating voltage, then before power supply unit 320 for the system no longer supplies voltage, switch unit 240 electrically connects communication units 210A and 210C together.

Thus when analog telephone 100A and VoIP telephone 100D are communicable with each other and analog telephone 100C and VoIP telephone 100B are communicable with each other, and if a power failure or the like occurs and network device 1000 no longer receives the device operating voltage, analog telephone 100A can be prevented from being unintentionally connected to analog telephone 100C. In other words, unintentional line connection between a plurality of telephones can effectively be prevented.

Hereinafter, a process in which analog telephone 100A and VoIP telephone 100D are communicable with each other and analog telephone 100C and VoIP telephone 100B are not communicable with each other (hereinafter this condition will also be referred to as a "single-line connection status"), will be described. In other words, it is assumed that the process in which VoIP telephone 100B makes a call to analog telephone 100C, as has been described with reference to FIG. 4, is not performed.

Figure 5:
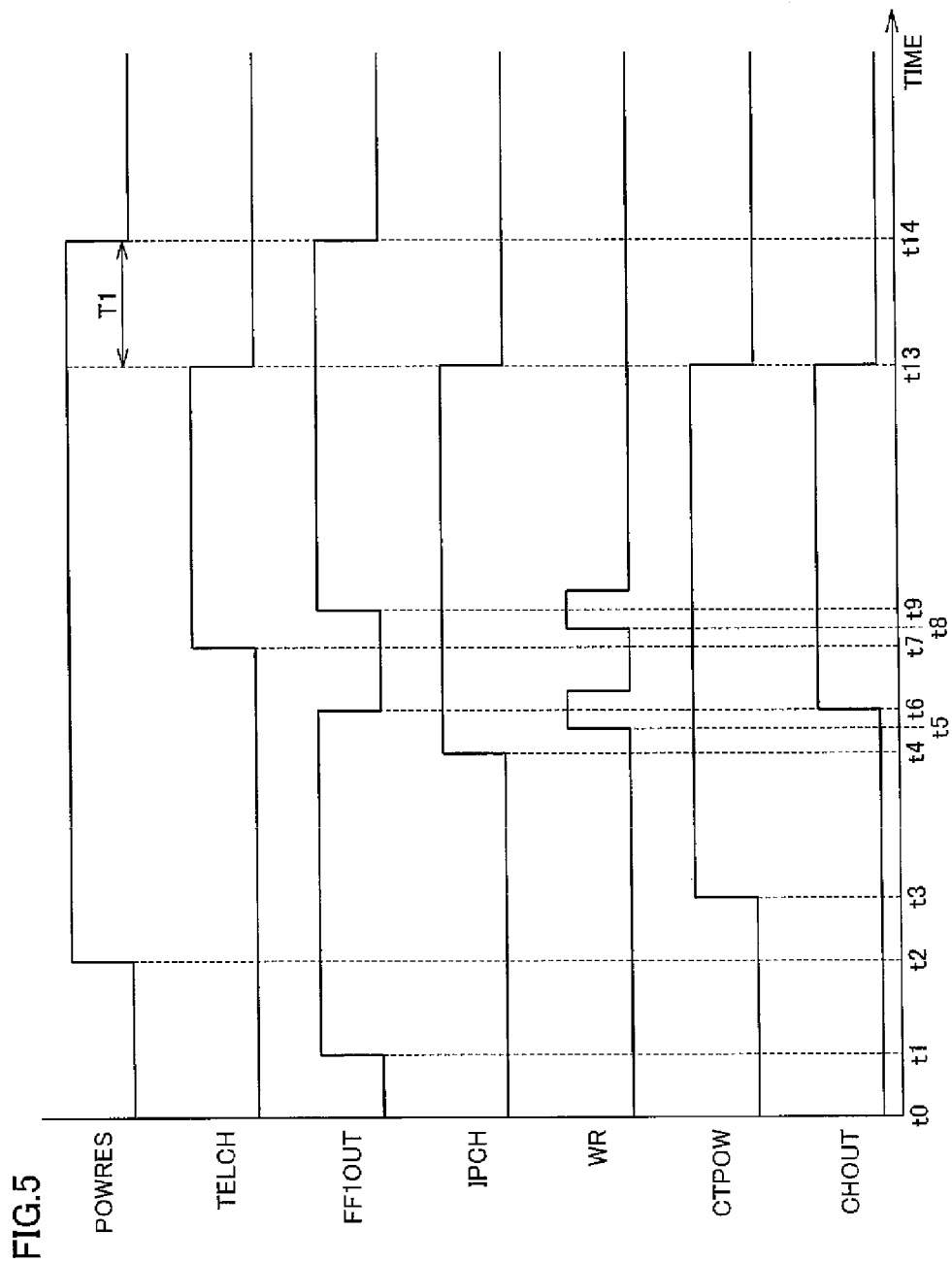
FIG. 5 is an operation waveform diagram, by way of example, for illustrating how the network device operates.

FIG. 5 is an operation waveform diagram, by way of example, for illustrating how network device 1000 operates. Note that the FIG. 5 operation waveform diagram is provided when the process in which VoIP telephone 100B makes a phone call to analog telephone 100C is not performed. In the FIG. 5 operation waveform diagram for times t0-t9 a process similar to that performed in FIG. 4 for times t0-t9 is performed. Accordingly it will not be described repeatedly in detail.

It is assumed that at a time between time t6 and time t7 analog telephone 100A is put off the hook and a process in which analog telephone 100A makes a phone call to VoIP telephone 100D is performed. This process is similar to that described with reference to FIG. 4, Accordingly, it will not be described repeatedly in detail. This process allows analog telephone 100A and VoIP telephone 100D to be communicable with each other.

Furthermore it is assumed that at time t7 and thereafter a process in which VoIP telephone 100B makes a phone call to analog telephone 100C is not performed.

Subsequently if at time t13 a power failure occurs for the sake of illustration, then the operating voltage that power supply 320A for the system supplies to each component is pulled to the L level. Accordingly, the operating voltage for control unit 230, i.e., voltage supply signal CTPOW, is also pulled to the L level. Accordingly, control unit 230 outputs line switching signals TELCH and IPCH pulled to the L level. LIU 222 and SLIC 224 also cease to operate. Thus analog telephone 100A and VoIP telephone 100D are no longer communicable with each other.

Even if a power failure occurs and AC adapter 310 no longer supplies voltage, power supply unit 322A for switching can supply switch unit 240 and status holding unit 400 with the predetermined level of operating voltage (i.e., voltage Vcc) for the predetermined period of time T1 longer than the time required to disable public network communication. Thus switch unit 240 and status holding unit 400 are also normally operable at time t13.

At time t13 flip flop circuit 410 outputs signal FF1OUT holding the H level in accordance with each data of row number "7" of operation table T100.

Furthermore at time t13 flip flop circuit 420 outputs switch control signal CHOUT pulled to the L level in accordance with each data of a row number "2" of operation table T100. Thus switch unit 240 has a function electrically connecting communication units 210A and 210C together in response to switch control signal CHOUT of the L level. Note that at the time analog telephone 100C is on the hook. Accordingly, when analog telephone 100A and VoIP telephone 100D are communicable with each other and if a power failure or the like occurs and network device 1000 no longer receives power, analog telephone 100A can be prevented from unintentionally being connected to analog telephone 100C. In other words, unintentional line connection between a plurality of telephones can effectively be prevented.

Note that when the predetermined period of time T1 elapses from time t13, i.e., when time t14 arrives, the operating voltage supplied by power supply unit 322A for switching is pulled to the L level. Accordingly, the operating voltage received by status holding unit 400 is pulled to the L level. Accordingly output signal FF1OUT is pulled to the L level.

Hereinafter, a process performed to determine whether a process in which VoIP telephone 100B makes a telephone call to analog telephone 100C when analog telephone 100A and VoIP telephone 100D are communicable with each other has been performed, will be described. (This process will hereinafter also be referred to as a process performed to determine public network connection.)

Figure 6:
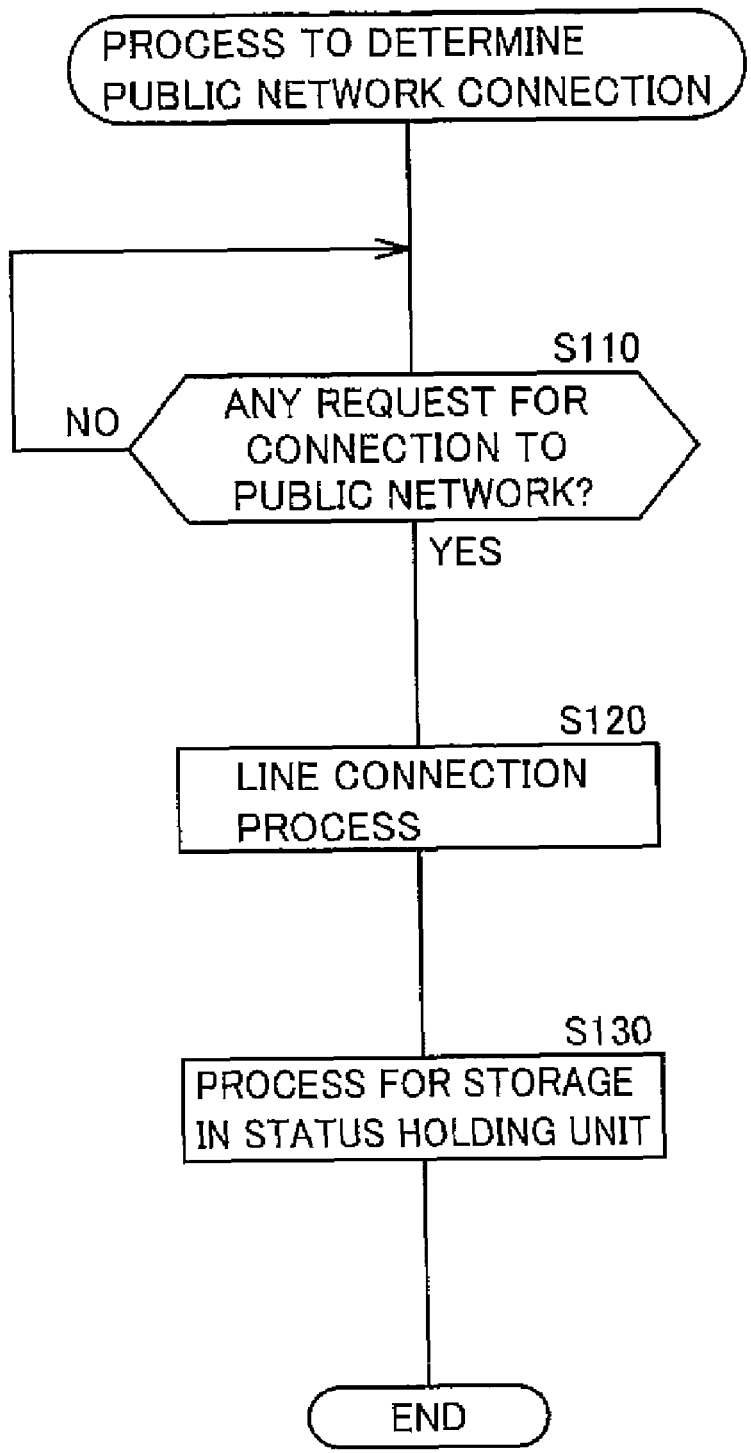
FIG. 6 is a flowchart of a process performed to determine public network connection.

FIG. 6 is a flow chart of the process performed to determine public network connection. With reference to FIG. 6, step S110 is performed to determine whether there is a request for connection to a public network. More specifically control unit 230 determines whether a process has been performed in which VoIP telephone 100B or 100D makes a phone call to analog telephone 100C connected to public network 70C. For the sake of illustration, a process in which VoIP telephone 100B makes a phone call to analog telephone 100C is performed.

If YES at step S110, the control proceeds to step S120. If NO at step S110, step S110 is repeated.

At step S120 a line connection process is performed. In this process is performed a process similar to that performed in FIG. 4 at a time between time t7 through time t10 when the process in which VoIP telephone 100B makes a phone call to analog telephone 100C is performed. Accordingly, it will not be described repeatedly in detail. Subsequently, the control proceeds to step S130.

At step S130 a process is performed for storage in the status holding unit. In this process, a process is performed to cause status holding unit 400 to store information indicating that control unit 230 is currently communicable with public network 70C. More specifically, the process that control unit 230 performs in FIG. 4 at time t10 and time t11 is performed. Accordingly, it will not be described repeatedly in detail. More specifically, flip flop circuit 410 outputs signal FF1OUT set at the L level. Subsequently, the process performed to determine public network connection ends.

The process performed to determine public network connection allows communication units 210A and 210C to be connected together when the predetermined period of time T1 elapses from time t13, at which a power failure occurs with control unit 230 communicable with public network 70C, i.e., when time t14 arrives, as has been described with reference to FIG. 4. Furthermore, if control unit 230 does not become communicable with public network 70C, the process performed to determine public network connection (i.e., simply repeating step S110) allows communication units 210A and 210C to be connected together when a power failure occurs or time t13 arrives, as has been described with reference to FIG. 5.

Thus in accordance with whether control unit 230 is communicate with public network 70C control unit 230 performs a process varying when to switch where to connect analog telephone 100A when a power failure or the like occurs and network device 1000 is accordingly no longer supplied with the device operating voltage.

A process (an IP telephone line connection process) will then be described in which after network device 1000 is powered on, i.e., after supplying network device 1000 with the device operating voltage has been started, a status allowing a call to be made with VoIP telephone 100B or 100D is provided.

Figure 7:
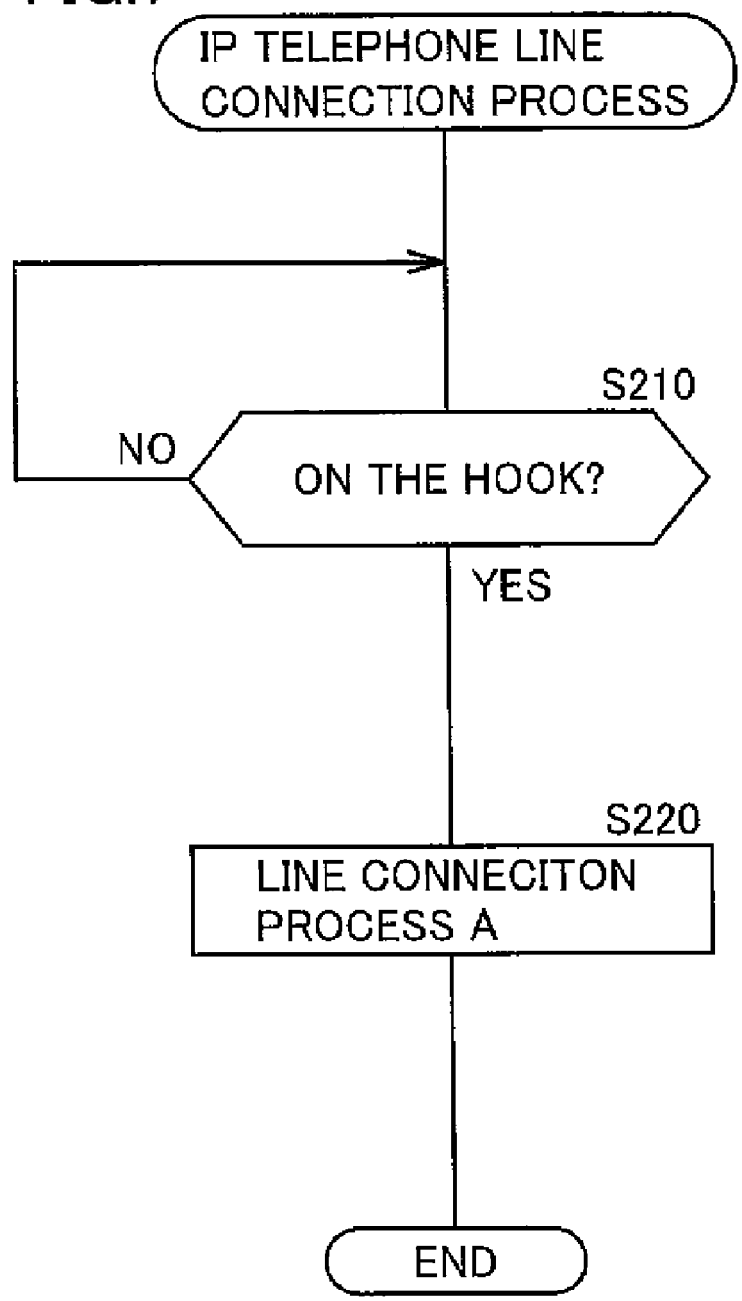
FIG. 7 is a flowchart of a process performed to connect an IP telephone line.

FIG. 7 is a flowchart of the IP telephone line connection process. In FIG. 7 at step S210 control unit 230 determines whether analog telephone 100A is on the hook. If YES at step S210, the control proceeds to step S220. If NO at step S210, step S210 is repeated. Subsequently, the control proceeds to step S220.

At step S220, a line connection process A is performed. In this process is performed a process performed as described in FIG. 4 at times t4, t5, t6. Accordingly, it will not be described repeatedly in detail. As a result of this process, analog telephone 100A is now ready for having a phone call with VoIP telephone 100B or 100D. Subsequently the IP telephone line connection process ends.

The IP telephone line connection process can thus effectively prevent for example analog telephone 100A having a call with analog telephone 100C from having the call interrupted.

It should be understood that the embodiments and examples disclosed herein are illustrative and non-restrictive in every respect. The scope of the present invention is defined by the terms of the claims, rather than the description above, and is intended to include any modification within the scope and meaning equivalent to the terms of the claims.

The invention claimed is:

1. A network device having a plurality of telephones each connected thereto over a public network or an Internet network or directly, comprising:
   a switch unit for switching where to connect a first telephone of said plurality of telephones between said public network and said Internet network, said first telephone being connected directly to the network device; and
   a power supply unit for supplying said switch unit with an operating voltage for operating said switch unit, wherein:
   said power supply unit is capable of supplying said operating voltage for a predetermined period of time as counted from when a device operating voltage supplied to operate the network device is no longer supplied;
   of said plurality of telephones, a second telephone is connected over said public network to the network device;
   of said plurality of telephones, a third telephone is an Internet telephone; and
   said switch unit includes an erroneous connection prevention unit preventing said first and second telephones from becoming communicable with each other when said second and third telephones are communicable with each other and the network device is no longer supplied with said device operating voltage.

2. The network device according to claim 1, wherein:
   said third telephone is connected over said Internet network to the network device; and
   after supplying the network device with said device operating voltage starts, said erroneous connection prevention unit connects said first telephone to said Internet network if said first telephone is disconnected from said public network.

3. The network device according to claim 1, wherein:
   said public network disallows a signal to be communicated between said public network and said second telephone when a path connecting said second and third telephones together is on a hook for a specified period of time shorter than said predetermined period of time; and
   when said second and third telephones are communicable with each other, and the network device is no longer supplied with said device operating voltage, then after the network device is no longer supplied with said device operating voltage when said predetermined period of time elapses said erroneous connection prevention unit connects said first telephone to said public network.

4. The network device according to claim 3, wherein:
   said third telephone is connected over said Internet network to the network device; and
   after supplying the network device with said device operating voltage starts, said erroneous connection prevention unit connects said first telephone to said Internet network if said first telephone is disconnected from said public network.

5. The network device according to claim 1, wherein:
   said public network disallows a signal to be communicated between said public network and said second telephone when a path connecting said second and third telephones together is on a hook for a specified period of time shorter than said predetermined period of time; and
   when said public network and said second telephone cannot communicate a signal therebetween and if the network device is no longer supplied with said device operating voltage, then after the network device is no longer supplied with said device operating voltage said erroneous connection prevention unit connects said first telephone to said public network.

6. The network device according to claim 5, wherein:
said third telephone is connected over said Internet network to the network device; and
after supplying the network device with said device operating voltage starts, said erroneous connection prevention unit connects said first telephone to said Internet network if said first telephone is disconnected from said public network.

\* \* \* \* \*